G. H. FINGER.
THIMBLES.

No. 180,215. Patented July 25, 1876.

WITNESSES:
A. W. Almqvist
John Goethals

INVENTOR:
G. H. Finger
BY
ATTORNEYS.

N. PETERS, PHOTO-LITHOGRAPHER, WASHINGTON, D. C.

UNITED STATES PATENT OFFICE.

GILBERT H. FINGER, OF NEW YORK, N. Y.

IMPROVEMENT IN THIMBLES.

Specification forming part of Letters Patent No. 180,215, dated July 25, 1876; application filed May 1, 1876.

*To all whom it may concern:*

Figure 1:
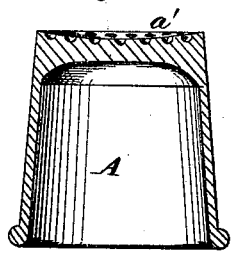
Figure 2:
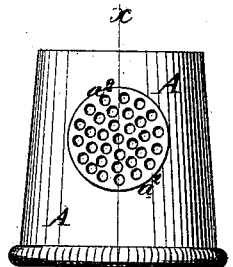
Figure 3:
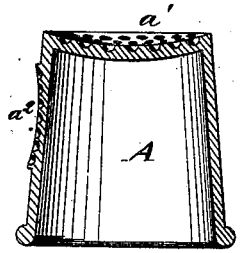
Figure 4:
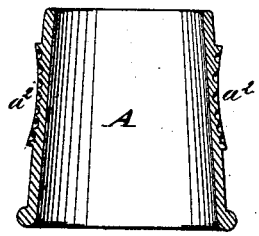

Be it known that I, GILBERT H. FINGER, of the city, county, and State of New York, have invented a new and Improved Thimble, of which the following is a specification:

In the accompanying drawing, Figure 1 is a longitudinal section of one of my improved thimbles. Fig. 2 is a side view of a modified form of the same. Fig. 3 is a longitudinal section, taken through the line $x$ $x$, Fig. 2, and Fig. 4 is a longitudinal section of another modified form of the same.

The object of this invention is to furnish thimbles which shall be so constructed as to prevent the eye of the needle, while being used, from slipping from the thimble, and injuring the fingers of the operator, and which shall be more convenient and effective in use than thimbles constructed in the usual way.

The invention consists in thimbles made with concave tops, in thimbles made with concave surfaces, one or more, upon their sides, and in thimbles in which the tops are made thicker than the sides, as hereinafter fully described.

In the accompanying drawing, figure A represents the body of the thimble, the top $a^1$ of which is made concave, as shown in Figs. 1 and 3, and the concave surface is then roughened, or indented in the usual way. Upon the sides of the thimble A are formed one or more concaved surfaces, $a^2$, which may be made circular or oval, or of any other desired form, and which are roughened or indented in the usual way. The thimbles may be made with closed tops, as shown in Figs. 1 and 3, or with open tops, as shown in Fig. 4.

The tops of the thimbles are made thicker than the sides to prevent the said tops from wearing through so quickly, and to prevent the finger of the operator from being injured by the eye of the needle passing in through said worn top.

Having thus described my invention, what I claim as new, and desire to secure by Letters Patent, is—

A thimble, having its top concaved and indented, as shown and described, for the purpose specified.

GILBERT H. FINGER.

Witnesses:
JAMES T. GRAHAM,
T. B. MOSHER.